March 24, 1953 C. J. ANDERSON ET AL 2,632,531
BRAKE BEAM SAFETY SUPPORT
Filed Feb. 27, 1951 2 SHEETS—SHEET 2
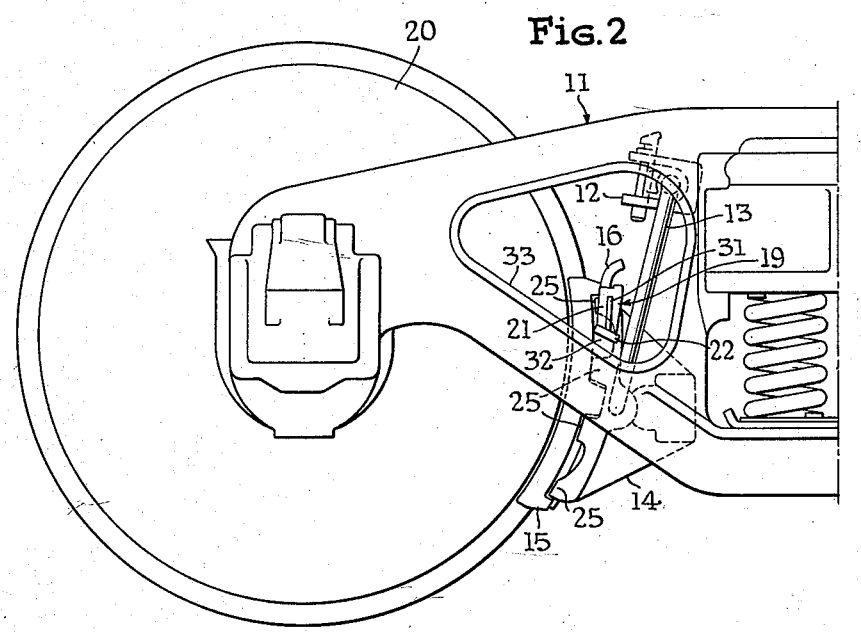
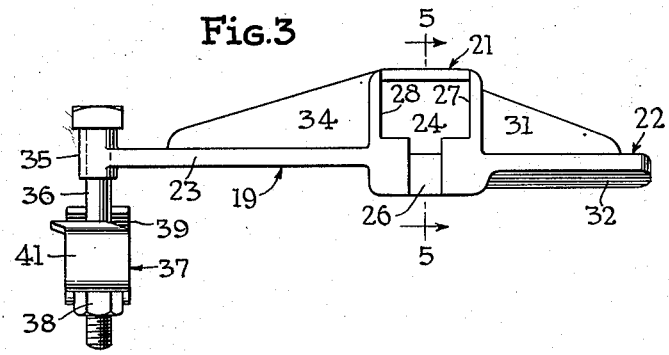
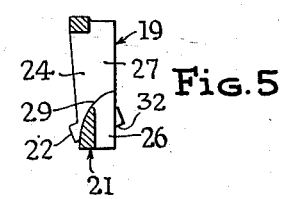
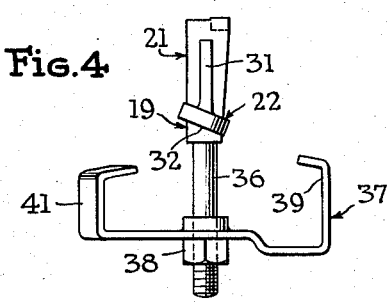
Inventor
Carl J. Anderson
William J. Miller
and William Jansky
Attorneys Patented Mar. 24, 1953

2,632,531

UNITED STATES PATENT OFFICE 2,632,531

BRAKE BEAM SAFETY SUPPORT

Carl J. Anderson, Council Bluffs, Iowa, and William J. Miller, North Platte, and William Jansky, Omaha, Nebr.

Application February 27, 1951, Serial No. 212,902

2 Claims. (Cl. 188—210)

This invention relates to an improved brake rigging safety support for railway trucks. Specifically it is concerned with a single safety support which acts to maintain both the brake beams and the brake head and shoe assembly clear of the roadbed should a failure occur in either the brake beams or the brake hanger or both.

An important advantage afforded by the invention is that the safety support is mounted between the brake shoe and brake head and is secured in place by the brake shoe key which is used to hold those parts in assembled relation. This results in elimination of the necessity of providing the truck frame casting with extra strap hangers or integral supporting lugs. The safety support may be installed and removed easily without having to disassemble the truck.

The invention will be described, having reference to the accompanying drawings in which:

Fig. 2 is a side view corresponding to Fig. 1.

Fig. 3 is a face view of the novel safety support.

Fig. 4 is an end view corresponding to Fig. 3.

Fig. 5 is a sectional view on the line 5—5 of Fig. 3.

Figure 1:
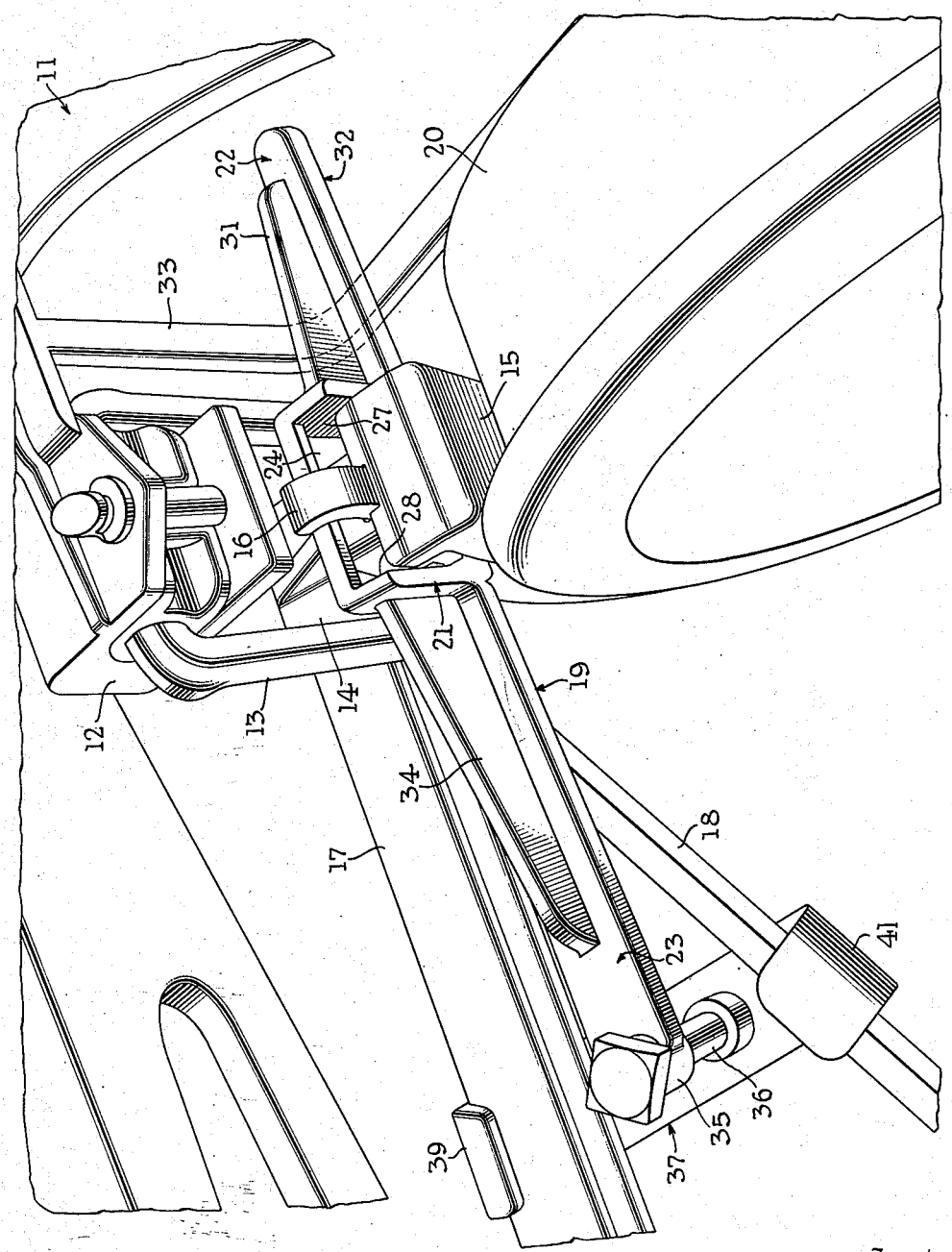
Fig. 1 is a fragmentary perspective view showing the assembled relationship of the novel safety support and the truck frame.

The side frame 11 of the car truck is provided with a hanger bracket 12 which supports a brake hanger 13. A conventional brake head 14 is carried at the lower end of the hanger 13. A brake shoe 15 is releasably secured to the brake head 14 by means of the key 16. Brake beam compression member 17 and tension member 18 are secured to the brake head 14. These members 17 and 18 move the brake shoe 15 into and out of contact with the wheel 20 and are actuated by any conventional type of brake rigging, not shown. A safety support 19 is retained between the brake head 14 and brake shoe 15 as will be more fully described.

The safety support 19 comprises a central portion 21 having oppositely directed lateral projections 22 and 23. The portion 21 is provided with an opening 24 which is bounded by plane surfaces 27 and 28 and a curved lower boundary surface 29. The surface 29 is shaped to conform to the interval between the projecting lugs 25 on the brake head 14. A keyway 26 is formed in the portion 21 and receives the key 16 when the brake shoe 15 and safety support 19 are assembled on the brake head 14.

The projection 22 comprises a web 31 and an inclined wear surface 32. This projection 22 extends laterally outward through an opening 33 in the side frame 11. The projection 23 includes a web 34 and has formed at the outer end thereof a sleeve 35. A bolt 36 is arranged to pass through the sleeve 35, and carries at its lower end a clip 37, which is retained by a nut 38. The clip 37 is provided with upturned ears 39 and 41 which engage the beams 17 and 18. The central portion of the clip 37 is thick enough to prevent its tilting relatively to the bolt 36, whereby a relatively rigid support assembly is afforded.

The safety support 19, after removal of the brake shoe 15, is placed against the brake head 14 so that the surface 29 engages the brake head 15 in the interval between the projections 25. The brake shoe 15 is then replaced and the key 16 inserted. The insertion of the key 16 serves to secure the parts in assembled relation and, by its cooperation with the keyway 26, serves to secure the support 19 against lateral motion.

As shown in Fig. 1 the projection 22 extends outwardly through the opening 33, while the projection 23 extends inward. After the support has been keyed in place, the clip 37 is put in place engaging the members 17 and 18 and is bolted to the end of projection 23.

Referring particularly to Fig. 1, it will be readily apparent that if the brake hanger 13 should fail, the brake head, brake shoe and beam assembly would fall downward. This downward motion would be arrested by engagement of the wear surface 32 with the side frame 11. It will also be apparent that should the brake beams 17 and 18 fail at a point intermediate the clip 37 and the brake head 14, downward motion of the free ends thereof would be prevented by the clip 37.

Simultaneous occurrence of the above described failures is also protected against because the support 19, the beams 17 and 18, clip 37 and bolt 36 form a relatively rigid structure, and downward motion of this structure is arrested by engagement of the projection 22 and the side frame 11.

A preferred form of the invention has been described in detail. However, no limitation to this precise form is implied except as is stated in the annexed claims.

We claim:

1. In combination with a car truck having a side frame; a brake hanger depending from said truck; a brake head carried by said hanger; a brake shoe carried by said head; a brake beam assembly secured to said brake head; supporting means retained between said head and said shoe, said means having an inward directed lateral projection; and a member interconnecting said beam assembly and said projection, and serving to support said beam assembly should a failure occur in said beam assembly between the points of attachment of said beam assembly to said member and to said brake head.

2. In combination with a car truck having a side frame; a brake hanger depending from said truck; a brake head carried by said hanger; a brake shoe carried by said head; a brake beam assembly secured to said head; a unitary supporting structure retained between said brake head and said brake shoe said structure comprising oppositely directed lateral projections, one of said projections extending outward through an opening in said side frame and the other extending inward, and means interconnecting the inward extending projection and said beam assembly, said structure serving to support said brake head and said beam assembly if failure of said hanger occurs and to support said beam assembly if failure of said beam assembly should occur between the points of its interconnection with said inward extending projection and said brake head and to support said head and said beam assembly if the failures defined occur simultaneously.

CARL J. ANDERSON.
WILLIAM J. MILLER.
WILLIAM JANSKY.

REFERENCES CITED

The following references are of record in the file of this patent:

UNITED STATES PATENTS

| Number | Name | Date |
|---|---|---|
| 1,923,120 | Shafer | Aug. 22, 1933 |
| 2,216,338 | Busse | Oct. 1, 1940 |
| 2,496,015 | Nelsen | Jan. 31, 1950 |